United States Patent [19]

Lal et al.

[11] 4,284,535

[45] Aug. 18, 1981

[54] RUBBER COMPOSITES SUITABLE FOR TIRE SIDEWALLS FROM HEXADIENE POLYMER

[75] Inventors: Joginder Lal, Akron, Ohio; Paul H. Sandstrom, Tallmadge, Ohio

[73] Assignee: The Goodyear Tire & Rubber Company, Akron, Ohio

[21] Appl. No.: 148,318

[22] Filed: May 9, 1980

Related U.S. Application Data

[60] Division of Ser. No. 948,293, Oct. 5, 1978, Pat. No. 4,240,487, which is a continuation of Ser. No. 728,482, Sep. 30, 1976, abandoned.

[51] Int. Cl.$^3$ ............................ C08L 7/00; C08L 9/00
[52] U.S. Cl. ........................................ 260/4 R; 260/5; 260/23.7 R; 260/23.7 H; 260/23.7 B; 260/23.7 M; 525/191; 525/215; 525/232; 525/236; 525/240; 525/241
[58] Field of Search ...................... 260/4 R, 5, 23.7 R, 260/23.7 H, 23.7 B, 23.7 M; 525/4, 191, 215, 236, 240, 333, 355, 232, 241

[56] References Cited

U.S. PATENT DOCUMENTS

| | | | |
|---|---|---|---|
| 3,937,862 | 2/1976 | Dillenschneider | 152/353 C |
| 4,003,420 | 1/1977 | Sandstrom et al. | 260/5 |
| 4,004,627 | 1/1977 | Sandstrom et al. | 260/5 |

FOREIGN PATENT DOCUMENTS

2422725  12/1974  Fed. Rep. of Germany .

OTHER PUBLICATIONS

Journal of Polymer Science, Polymer Letter Edition, vol. 13, (1975), pp. 83–85.

*Primary Examiner*—Harold D. Anderson
*Attorney, Agent, or Firm*—H. C. Young, Jr.

[57] ABSTRACT

The invention relates to elastomer composites which can be used for pneumatic tire sidewalls. Such composite particularly comprises a manipulated blend of (A) a hexadiene polymer, (B) high unsaturation rubber, and optionally, (C) a low unsaturation rubber. The sidewall composition particularly enhances the adhesion of the sidewall to the tire carcass stock.

7 Claims, 3 Drawing Figures

U.S. Patent    Aug. 18, 1981    4,284,535
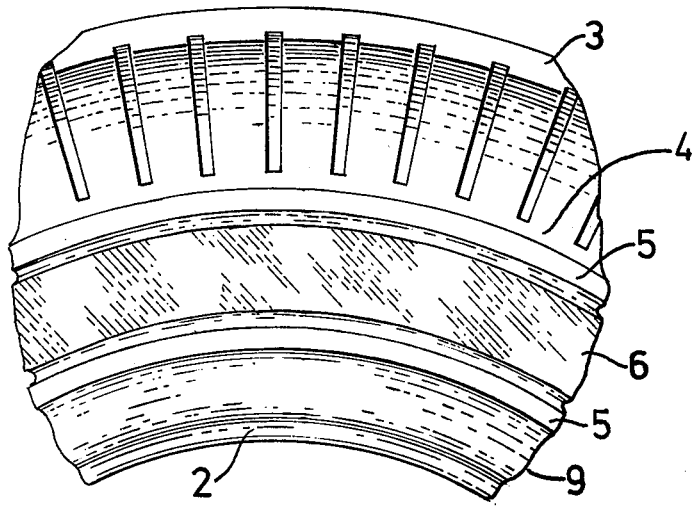
FIG. 1
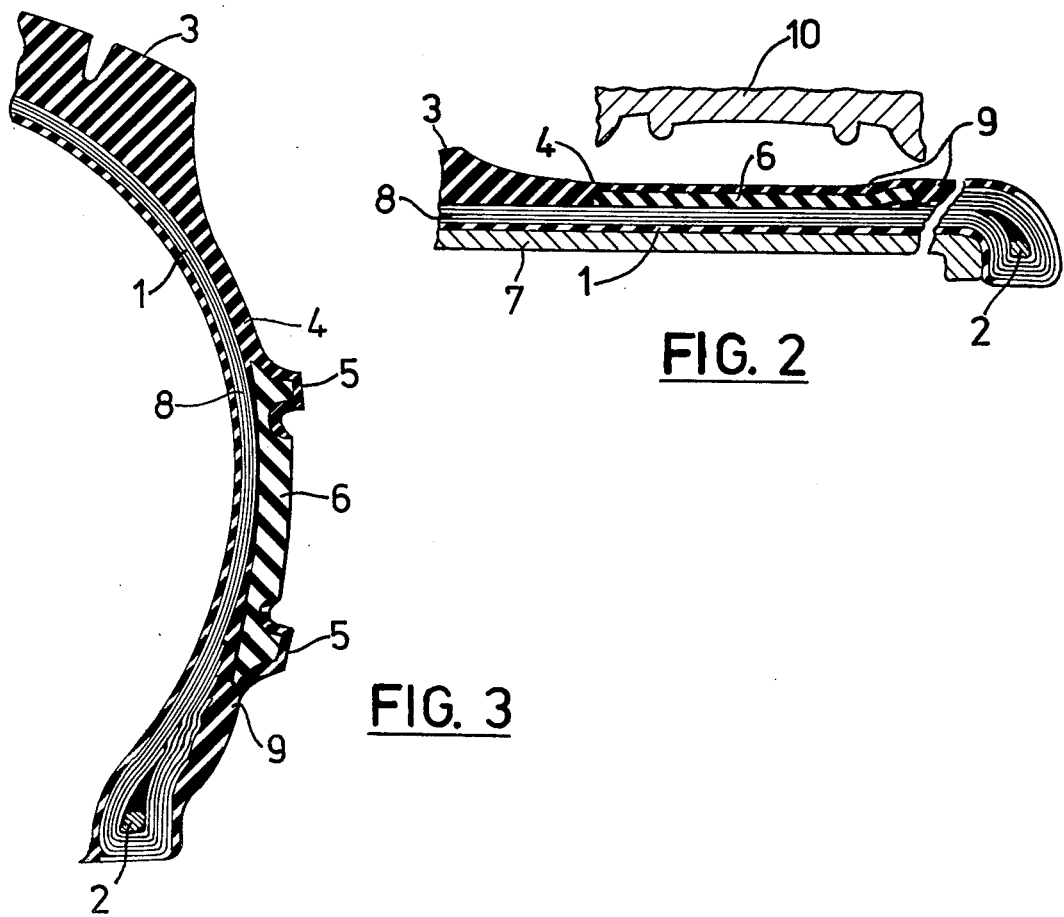
FIG. 2
FIG. 3

RUBBER COMPOSITES SUITABLE FOR TIRE SIDEWALLS FROM HEXADIENE POLYMER

This is a division, of application Ser. No. 948,293, now U.S. Pat. No. 4,240,487 filed Oct. 5, 1978, which is a continuation of application Ser. No. 728,482, now abandoned filed Sept. 30, 1976.

This invention relates to ozone-resistant elastomer blends, particularly useful for pneumatic tire sidewalls. The invention particularly relates to tire sidewalls and to corresponding elastomer compositions. Such elastomeric blends, or compositions, are useful for sidewalls of tires, including white sidewalls, black sidewalls and coverstrips for white sidewalls as well as industrial products such as belts and motor mounts.

Pneumatic rubber tires are typically prepared with a protective outer sidewall portion, which can consist entirely of a black sidewall or of a white sidewall under a black coverstrip portion which is at least partially buffed away to expose a desired width of the white sidewall. Such sidewalls are subjected to extensive flexing and continual distortion under normal running conditions of the tire under load. Such conditions include temperatures significantly higher than the ambient temperature.

Degradation of the sidewall under these conditions is made visible quickly and dramatically by environmental chemical action, flex-cracking and loss of adhesion to the tire carcass. The atmospheric chemical action, such as ozone attack and flex-cracking erode and degrade the sidewall. Adhesion deficiency of the layers of rubber at the elevated operating temperatures can typically result in a separation of the sidewall from the carcass. All these degradative factors promote tire failure hazards.

Therefore, it is an object of this invention to provide a pneumatic tire with a sidewall of a novel rubber composition having improved adhesion to the carcass under degradative operating conditions.

It is well known that EPDM rubbers, terpolymers of ethylene, propylene and a nonconjugated diene, offer many superior qualities, particularly excellent resistance to ozone and aging. It is also well known in the art that elastomeric blends of EPDM rubber and high unsaturation rubbers prepared from conventional, conjugated dienes are used in tire sidewalls because of the ozone resistance imparted by the EPDM. However, the addition of the EPDM to such high unsaturation rubbers in the sidewall composition has been known to cause a substantial loss of adhesion to tire carcass stock.

THE INVENTION

It has now been discovered that improved sidewalls of a pneumatic tire which are subjected to extensive flexing can be prepared from a suitably cured elastomer blend of a new combination of elastomeric materials. The sidewalls so obtained have been found to provide good adhesion to tire carcass.

In accordance with this invention, a pneumatic rubber tire is provided comprising a generally toroidal shaped carcass with a circumferential tread, shaped beads and connecting sidewall portions extending between said tread and beads and having adhered to said sidewall portion an outer rubbery sidewall layer extending from the general area of said bead portion towards said tread, where said rubbery sidewall layer is comprised of an elastomeric composition comprised of (A) 15 to 60, preferably 20 to 50, parts by weight of rubbery hexadiene polymer, (B) 85 to 40, preferably 80 to 50, parts by weight of high unsaturation rubber and (C) 0 to 40, preferably 0 to 30 parts by weight of low unsaturation rubber which is preferably a halobutyl rubber and/or an EPDM.

If the sidewall layer is white or has a color, a coverstrip layer is generally at least partially superimposed on it. After curing, the overlapping coverstrip is customarily buffed to expose a desired width of the white or colored sidewall composition.

The high unsaturation rubbers are those selected from the group consisting of natural high cis-1,4-polyisoprene rubber, synthetic high cis-1,4-polyisoprene, high cis-1,4-polybutadiene, butadiene/styrene rubber (SBR), emulsion or solution, SBR and polyalkenylenes. Natural rubber with SBR or polybutadiene are preferred. The total amount of rubber in the formulation is based on 100 parts by weight. The peel adhesion of the blend composition of this invention to tire carcass stock was found to be unexpectedly higher than that obtained from conventional blends containing both low unsaturation and the high unsaturation rubbers. These blend compositions without any added antiozonant in the curing recipe also exhibit excellent ozone resistance under static or dynamic test conditions.

It should be understood by one skilled in the art that said outer sidewall and coverstrip layer compositions can be compounded by methods generally known in rubber compounding such as by mixing the constituent rubbers in the recipe with various curatives, processing additives, fillers, pigments, antioxidants and antiozonants. However, in order to maintain compatibility with the basic pneumatic rubber tire carcass, it is required that the said cured sidewall and coverstrip layers be characterized by having a 300 percent modulus at 25° C. in the range of about 500–1200 pounds per square inch, preferably 600–800 pounds per square inch.

Further objects and advantages of this invention with regard to pneumatic rubber tires will be apparent when the specification is read in conjunction with the accompanying drawings in which FIG. 1 is a side elevational view of a pneumatic rubber tire employing this invention, FIG. 2 is a cross-sectional view, with parts broken away, of a green tire lay-up and a portion of the mold for the tire, and FIG. 3 is a partial cross-sectional view of the molded and cured rubber tire.

Referring to the drawings, the cured rubber tire comprises the usual carcass (1), bead portions (2), tread portion (3), and connecting sidewall portion (4). One or more scuff ribs (5) may extend circumferentially around the side of the tire to protect an outer colored sidewall layer (6).

More specifically, the tire is typically formed on a building drum (7) with the usual carcass plies (8), bead (2), and tread (3). At least one of the sidewalls (4) includes an outer adherent colored sidewall layer (6) between the ribs (5) other than black, and an adherent coverstrip (9) extending from the bead portion (3) over at least a portion of the said colored sidewall overlay (6). If desired, the coverstrip overlay can be extended to the tread portion (3).

The green tire is then placed in a mold (10) where it is heated and cured to form the cured tire more clearly shown as cross-sectional view by FIG. 3.

The cured sidewall coverstrip is buffed to remove a portion thereof and expose the colored sidewall overlay (6) as demonstrated in the cross-sectional view of FIG. 3.

Thus, the completed vehicular tire, which typically may be of the bias, bias-belted or radial construction, exhibits a black sidewall or coverstrip layer having improved hot peel adhesion to the tire carcass.

In the description of this invention, the required rubbery hexadiene polymers are selected from homopolymers and interpolymers of nonconjugated diolefins defined by the formula:

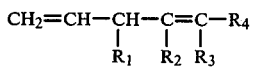

where $R_1$, $R_2$ and $R_3$ are from the group of hydrogen, a lower alkyl group containing up to 4 carbon atoms or an aryl group, and $R_4$ is from the group of a lower alkyl group containing up to 4 carbon atoms or an aryl group, said polymers containing at least 50% repeat units of the structure:

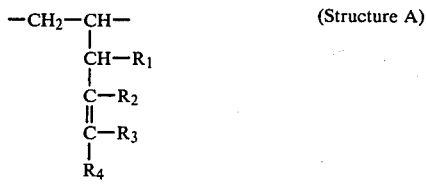

(Structure A)

where $R_1$, $R_2$, $R_3$ and $R_4$ are defined as before. Some representative examples are: cis-1,4-hexadiene, trans-1,4-hexadiene, cis-1,4-heptadiene, trans-1,4-heptadiene, 4-methyl-1,4-hexadiene, 5-methyl-1,4-hexadiene, 4-ethyl-1,4-hexadiene, 5-ethyl-1,4-hexadiene, 4-butyl-1,4-hexadiene, 5-butyl-1,4-hexadiene, 3-methyl-1,4-hexadiene, 3,4-dimethyl-1,4-hexadiene, cis-1,4-nonadiene, trans-1,4-nonadiene, 6-phenyl-1,4-hexadiene, 5-phenyl-1,4-hexadiene, 5-p-tolyl-1,4-hexadiene and 4,5-diphenyl-1,4-hexadiene and mixtures thereof, thus, indicating that interpolymers as well as homopolymers may be prepared in accordance with the practice of this invention. Preferred are trans-1,4-hexadiene, 4-methyl-1,4-hexadiene and 5-methyl-1,4-hexadiene.

Certain of the hexadiene homopolymers and interpolymers are especially rubbery in nature and exhibit a striking combination of fast cure rate, excellent resistance to ozone attack, low Mooney viscosity and high damping (i.e. low resilience).

In the preparation of the hexadiene polymers, polymerizations of the monomers of this formula may be accomplished by the use of transition metal compound-organometallic compound catalysts generally known as coordination catalysts, utilizing either bulk polymerizations or solution polymerizations in the presence of inert solvents. Both batch and continuous polymerization techniques may be used.

If solution polymerization techniques are employed in preparing the hexadiene polymers, any inert solvent which does not adversely affect the coordination catalyst polymerization system or the resulting polymers formed may be employed. The non-conjugated diolefin, or mixtures thereof, is simply dissolved in an inert solvent prior to the addition of the catalyst to start the polymerization. Representative of suitable solvents are saturated aliphatic hydrocarbons such as pentane and heptane; cycloaliphatic hydrocarbons such as cyclohexane; aromatic hydrocarbons such as benzene and toluene; and chlorinated hydrocarbons such as chlorobenzene and tetrachloroethylene. The amount of solvent, if a solvent is employed, may vary widely and is not critical to the solution polymerization system. The amounts usually employed are sufficient to obtain a solution of the homopolymers and interpolymers which is not too viscous so that suitable heat transfer rates can be maintained. Usually the amount of solvent to monomer employed ranges from about 1/1 to about 10/1 on a weight basis with about 3/1 to about 5/1 being preferred.

The amount of catalyst employed in the polymerization of the monomers with coordination catalysts may vary widely and will depend on a number of factors such as monomer concentration, purity of the system, temperature of polymerization and other such known factors. The speed of the polymerization reaction is furthermore influenced by the degree of sub-division of the active surface with which the activated compounds are brought into contact. For instance, the active surface catalyst can be adsorbed on cryolite or on a finely divided filler such as titanium dioxide, glass, silica or carbon black. It has been found suitable to use 0.01 to 5 parts of the catalyst per 100 weight parts of the monomer, the preferred range being 0.2 to 3 parts. All parts are on a weight basis. Polymerization may be carried out at $-78°$ C. to $+100°$ C., the preferred range being $0°$ C. to $+50°$ C.

It has been indicated that to form these rubbery polymers a catalyst generally known as a coordination type catalyst may be used. However, depending on the structure of the monomers employed, the resulting polymers may also be leathery or resinous in character. Representative of such catalyst systems is a mixture of an organometallic reducing agent with a transition metal salt, or mixtures thereof. Compounds of the transition heavy metals are those derived from metals of the B subgroups of IV to VII or Group VIII of the Periodic Table. The organometallic reducing agents are selected from organometallic compounds, hydrides and free metals of Groups I to IV of the Periodic Table. The compounds of the transition metals are preferably halides, oxyhalides and alcoholates, the preferred metals being titanium and vanadium. The metals of the organometallic reducing agents are preferably lithium, magnesium, aluminum and tin and the organic portions are preferably alkyl radicals. In these organometallic compounds, the valences of the metal may be partially satisfied by halogen or alkoxyl, provided, of course, that at least one bond connects the metal with an organic radical. Mixtures of two or more compounds of the type described above may often be used to advantage. These catalysts are not the subject of the present application. Coordination catalysts have been reviewed in "Stereochemistry of Macromolecules", edited by A D Ketley and published by Marcel Dekker, Inc, New York (1967). The addition of a third component, consisting of an electron donor molecule, may be employed to the benefit of the above coordination catalysts. Examples of donor molecules include various amines, phosphines, ethers, pyridines, phosphoric triamides, vinylsilanes, alkoxysilanes, and related compounds classified as electron donor molecules. The molar ratio of the donor compound to transition metal compounds may be between 0.1–10, the preferred ratio being 0.3–5.

It should be noted that unlike homopolymers and copolymers of conjugated diolefins heretofore known, the hexadiene homopolymers and interpolymers are unique in that there are generally very few, if any, double bonds situated along the polymer chain. The predominant structure is Structure A. For instance, in the prior art in processes such as emulsion polymerizations of conjugated diolefins by means of a free radical catalyst system there are formed a mixture of polymers which contain a variety of spacial configurations. For instance, in the homopolymerization of the monomer 1,3-butadiene by such a process, a mixture of cis-1,4- and trans-1,4- and 1,2- structures is formed, as shown by the following structural formulas B, C and D:

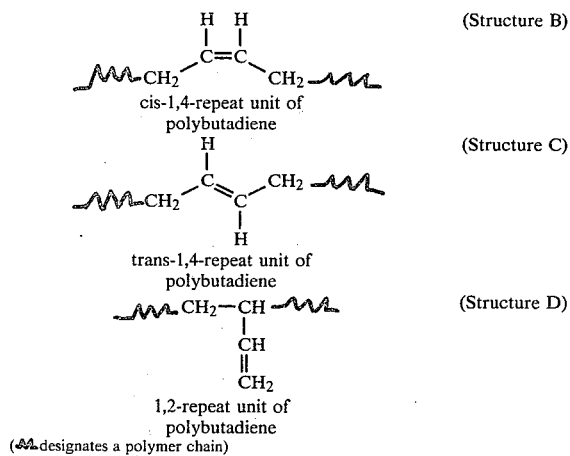

(Structure B) cis-1,4-repeat unit of polybutadiene (Structure C) trans-1,4-repeat unit of polybutadiene (Structure D) 1,2-repeat unit of polybutadiene ($\sim$ designates a polymer chain)

In the rubbery 1,4-polybutadienes, the residual double bonds appear in the polymer chain or backbone of the polymers. Likewise, in the solution polymerization of conjugated diolefins such as 1,3-butadiene or isoprene using a coordination or alkyllithium catalyst, a high percentage of 1,4-polymers is obtained which have in their backbones the residual double bonds. It is these double bonds in the polymer chain which are subject to attack by ozone, and which also activate adjacent carbon atoms for attack by oxygen. These attacks usually result in scission of the polymer chains and, thus the resulting polymers are of much lower molecular weights after such attacks. When these polymers are used in fabricated products, their properties deteriorate on aging as a result of the attack of oxygen and/or ozone.

In the description of this invention, EPDM means an ethylene-propylene-diene rubber containing from about 20 to 75 weight percent ethylene, from about 80 to 25 weight percent propylene, and a minor proportion of from about 1 to 15 weight percent of $C_5$-$C_{30}$ nonconjugated diene. Typical examples of EPDM are rubbery terpolymers of ethylene, propylene and a suitable diene such as 1,4-hexadiene, dicyclopentadiene, ethylidene norbornene, or methylene norbornene.

In the description of this invention, halobutyl rubber is a chlorinated or brominated butyl rubber. Such halobutyl rubber is typically prepared by the normal solution copolymerization of isobutylene and isoprene to form a butyl-type rubbery copolymer containing about 95 to about 98 weight percent isobutylene and, correspondingly, about 5 to about 2 weight percent isoprene. The isobutylene/isoprene copolymer is then chlorinated or brominated in solution by methods known in the chlorination/bromination art to form the halobutyl rubber containing about 0.5 to about 2.0, preferably 1.0 to about 1.5, weight percent chlorine or bromine and about 0.5 to about 3.5, preferably about 0.6 to about 2.5, mole percent unsaturation expressed in units of carbon-to-carbon double bonds per kilogram of polymer as typically determined by Nuclear Magnetic Resonance analysis.

In the description of this invention, emulsion SBR is an emulsion copolymer of styrene and butadiene containing less than 50, and typically about 2 to about 30 percent by weight of styrene. Solution SBR means random copolymers of styrene and butadiene prepared with lithium or alkyllithium catalysts and containing less than 50, and typically about 2 to about 30 percent by weight of styrene.

High cis-1,4-polyisoprene means a homopolymer of isoprene containing more than 70 percent cis-1,4 structure.

High cis-1,4-polybutadiene means a homopolymer of butadiene containing more than 70 percent cis-1,4 structure.

Polyalkenylenes mean homopolymers of cyclomonoolefins, homopolymers of nonconjugated cyclopolyolefins, and interpolymers of cyclomonoolefins with nonconjugated cyclopolyolefins. Examples are: polypentenylene, a cis/trans homopolymer of cyclopentene; polyoctenylene, a 25-95% cis, 75-5% trans homopolymer of cyclooctene; polyoctadienylene, a homopolymer of 1,5-cyclooctadiene having about 25-85 percent cis and 75-15 percent trans configurations of double bonds; copolymers of cyclopentene and dicyclopentadiene containing 10-40 mole percent dicyclopentadiene; and copolymers of cyclooctene and 1,5-cyclooctadiene containing 10-50 mole percent of the cyclooctadiene.

Phr means parts by weight per hundred parts total rubber.

Examples of high unsaturation diene rubbers are natural rubber, synthetic high cis-1,4-polyisoprene, high cis-1,4-polybutadiene, 1,3-butadiene-styrene copolymers (SBR) and polyalkenylenes.

The elastomers required in this invention are readily prepared by catalysts known to the art.

Inherent viscosity values for the polymers were obtained at 30° C. on 0.05-0.1 percent (w/v) solution in toluene and are expressed in units of deciliters per gram (dl/g).

The practice of this invention is further illustrated by reference to the following examples which are intended to be representative rather than restrictive of the scope of the invention. Unless otherwise indicated, all parts and percentages are by weight.

EXAMPLE 1

A. Test sample preparation.

Samples of several rubber blend compositions for use in the tire sidewalls were prepared and examined for their peel adhesion to a representative pneumatic rubber tire carcass. Such rubber blend compositions were prepared by mixing the rubbers in a Banbury with carbon black and other ingredients as specified in Table I. Sulfur and accelerators were then milled into the black stocks. The resulting compositions were sheeted out and a 6"×6" sample (60 grams) cut out for use in the fabrication of a peel test block 6"×6"×0.25".

The peel test block consisted of a layer of the above described blend composition stock resting against a layer of carcass stock and separated at one end by a 1½" wide strip of heavy aluminum foil. These two stocks were sandwiched between outer layers of nylon cord backing. The test block was cured for 18 minutes at 300° F. Test samples, 1" wide, were cut out from the peel test block. The ends of the test sample, separated by the aluminum foil, were placed in the jaws of an Instron machine for the peel test. After conditioning for 10 minutes at 200° F., the ends were pulled (2"/min.) at a 90° angle to the test piece and adhesion values recorded. Two samples of each composition were tested. A typical carcass rubber composition used for adhesion testing is shown in Table II.

B. Results

The data in Table III show the dramatic effect on adhesion of total replacement of EPDM (Royalene 301T, a trademark of Uniroyal) with rubbers synthesized from nonconjugated 1,4-dienes. The rubber blend compositions also contained natural rubber (No. 1 smoked sheet) and SBR 1502 (an emulsion copolymer of 23.5 percent styrene and 76.5 percent butadiene). The total replacement of EPDM with poly(cis-1,4-hexadiene), poly(trans-1,4-hexadiene) or poly(4/5-methyl-1,4-hexadiene) increased the peel adhesion to tire carcass stock by 28, 224, and 64 percent respectively. The resulting torn surfaces of the test piece showed greater roughness than the control sample containing EPDM. These results indicate that EPDM can be replaced with the nonconjugated 1,4- diene polymers and lead to a significant increase in hot peel adhesion to tire carcass stock. These data are novel and are not predictable from the prior art.

TABLE I

| Tire Sidewall Compounding Recipe | | |
|---|---|---|
| Compound | Parts | |
| Rubbers | 100 | |
| FEF Carbon Black | 25 | |
| Stearic Acid | 2 | Banbury |
| Zinc Oxide | 3 | Mix |
| Antiozonant | 0.75 | |
| Antioxidant | 0.75 | |
| Sulfur | 1.5 | Mill Mix |
| Accelerators | 0.9 | |

TABLE II

| Compound | Parts |
|---|---|
| Natural Rubber (Brown Crepe No. 2) | 100 |
| Processing Oil | 5 |
| Tackifying Resins | 7.5 |
| Stearic Acid | 2 |
| Antioxidant (phenolic) | 1 |
| Carbon Black | 30 |
| Sulphur | 2.75 |
| Zinc Oxide | 3 |
| Accelerator | 1.55 |

TABLE III

PEEL ADHESION OF RUBBER BLEND TIRE SIDEWALL COMPOSITIONS TO A CARCASS STOCK

| Rubber Blend Composition (In parts by weight) | | | | Peel Adhesion lbs/inch |
|---|---|---|---|---|
| Natural Rubber | SBR 1502 | EPDM | Nonconjugated 1,4-diene rubber | |
| 35 | 35 | 30 | | 25 |
| 35 | 35 | 0 | 30 poly(cis-1,4-hexadiene)[a] | 32 |
| 35 | 35 | 0 | 30 poly(trans-1,4-hexadiene)[b] | 81 |
| 35 | 35 | 0 | 30 poly(4/5-methyl-1,4-hexadiene)[c] | 41 |

TABLE III-continued

PEEL ADHESION OF RUBBER BLEND TIRE SIDEWALL COMPOSITIONS TO A CARCASS STOCK

| Rubber Blend Composition (In parts by weight) | | | | Peel Adhesion lbs/inch |
|---|---|---|---|---|
| Natural Rubber | SBR 1502 | EPDM | Nonconjugated 1,4-diene rubber | |

[a]Inherent viscosity 1.3; monomer of 97% purity cis 1,4-hexadiene was polymerized to 25% conversion.
[b]Inherent viscosity 2.1; monomer containing 93% trans-1,4-hexadiene and 7% cis-1,4-hexadiene was polymerized to 31% conversion.
[c]Inherent viscosity 0.8; 60/40 mixture of 4- and 5-methyl-1,4-hexadiene was used for polymerization to 64% conversion.

EXAMPLE 2

Samples of several rubber blend compositions for use in the tire sidewalls were prepared and examined for their peel adhesion to a representative pneumatic rubber tire carcass. Such rubber blend compositions were prepared by mixing the rubbers in a Banbury with carbon black and other ingredients as specified in Table IV. Sulfur and accelerators were then milled into the black stocks. These rubber compositions were tested as described in Example 1. The data in Table V show the effect on adhesion of total replacement of EPDM (Royalene 301T, a trademark of Uniroyal) with poly(trans-1,4-hexadiene) or poly(5-methyl-1,4-hexadiene). The rubber blend compositions also contained natural rubber (No. 1 smoked sheet), cis-1,4-polybutadiene (minimum 95 percent cis-1,4 structure, inherent viscosity 3.0), and chlorobutyl. The total replacement of EPDM with poly(trans-1,4-hexadiene) or poly(5-methyl-1,4-hexadiene) increased the peel adhesion to tire carcass stock by 105 and 91 percent respectively. These data are novel and are not predictable from the prior art.

A kinetic ozone test was conducted on a cured sample (18 minutes at 300° F.) 6"×0.5"×0.08". This sample was flexed from zero to about 25 percent elongation at the rate of 25 cycles per minute. Flexing was carried out for 72 hours in an ozone chamber having ozone concentration of 50 parts per 100 million by volume. None of the test samples of the compositions shown in Table V exhibited any visible signs of ozone cracking.

TABLE IV

| COMPOUND RECIPE | | |
|---|---|---|
| Compound | Parts | |
| Rubbers | 100 | |
| FEF Carbon Black | 30 | |
| Processing Oil | 2 | |
| Tackifying Resin | 5 | |
| Stearic Acid | 1 | Banbury Mix |
| Zinc Oxide | 3 | |
| Magnesuium Oxide | 1 | |
| Antioxidant (Phenolic) | 2 | |
| Sulfur | 0.75 | Mill Mix |
| Accelerators | 1.7 | |

TABLE V

PEEL ADHESION OF RUBBER BLEND TIRE SIDEWALL COMPOSITIONS TO A CARCASS STOCK

| Rubber Blend Composition | | | | | Peel Adhesion, lbs/inch |
|---|---|---|---|---|---|
| Natural Rubber | PBD[c] | Chlorobutyl[d] | EPDM | 1,4-diene rubber | |
| 25 | 25 | 30 | 20 | 0 | 22 |

TABLE V-continued
PEEL ADHESION OF RUBBER BLEND TIRE SIDEWALL COMPOSITIONS TO A CARCASS STOCK

| Rubber Blend Composition | | | | | |
|---|---|---|---|---|---|
| Natural Rubber | PBD[c] | Chlorobutly[d] | EPDM | 1,4-diene rubber | Peel Adhesion, lbs/inch |
| 25 | 25 | 30 | 0 | 20 poly(trans-1,4-hexadiene)[a] | 45 |
| 25 | 25 | 30 | 0 | 20 poly(5-methyl-1,4-hexadiene)[b] | 42 |

[a]Inherent viscosity 2.7; monomer containing 93% trans-1,4-hexadiene and 7% cis-1,4-hexadiene was polymerized to 17% conversion.
[b]Inherent viscosity 1.7; monomer of 98% purity 5-methyl-1,4-hexadiene was polymerized to 98% conversion.
[c]Polybutadiene. (Budene 501, The Goodyear Tire & Rubber Company trademark)
[d]Enjay Butyl HT10-66, a trademark of Enjay Chemical Co

EXAMPLE 3

Samples of several rubber blend compositions for use in tire white sidewalls were prepared and examined for their peel adhesion to a representative pneumatic rubber tire carcass. Such rubber blend compositions were prepared by mixing the rubbers in a Banbury with titanium dioxide, clay and other ingredients as specified in Table VI. Sulfur and accelerators were then milled into the stocks. These rubber compositions were tested as described in Example 1. The data in Table VII show the effect on adhesion of total replacement of EPDM (Royalene 301T, a trademark of Uniroyal) with poly(trans-1,4-hexadiene) or poly(5-methyl-1,4-hexadiene). The rubber blend compositions also contained natural rubber (No. 1 smoked sheet) and cis-1,4-polybutadiene (minimum 95 percent cis-1,4-structure, inherent viscosity 3.0). The total replacement of EPDM with poly(trans-1,4-hexadiene) or poly(5-methyl-1,4-hexadiene) increased the peel adhesion to tire carcass stock by 73 and 54 percent, respectively.

TABLE VI
COMPOUND RECIPE

| Compound | Parts | |
|---|---|---|
| Rubbers | 100 | |
| Titanium Dioxide | 45 | |
| Clay | 20 | |
| Processing Oil | 2.5 | Banbury Mix |
| Stearic Acid | 1 | |
| Zinc Oxide | 5 | |
| Sulfur | 1.5 | Mill Mix |
| Accelerators | 1.95 | |

TABLE VII
PEEL ADHESION OF RUBBER BLEND TIRE WHITE SIDEWALL COMPOSITIONS TO A CARCASS STOCK

| Natural Rubber | PBD[a] | EPDM | 1,4-diene Rubber | Peel Adhesion, lbs/inch |
|---|---|---|---|---|
| 55 | 20 | 25 | 0 | 26 |
| 55 | 20 | 0 | 25 poly(trans-1,4-hexadiene)[b] | 45 |
| 55 | 20 | 0 | 25 poly(5-methyl-1,4-hexadiene)[c] | 40 |

[a]Polybutadiene, Budene 501, Inherent viscosity 2.5 dl/g.
[b]Inherent viscosity 2.5; monomer containing 93% trans-1,4-hexadiene and 7% cis-1,4-hexadiene was polymerized to 16% conversion.
[c]Inherent viscosity 1.7; monomer of 98% purity 5-methyl-1,4-hexadiene was polymerized to 98% conversion.

EXAMPLE 4

Stress-strain data for several rubber blend tire sidewall compositions are shown in Table VIII. The blends in Series A contained natural rubber (No. 1 smoked sheet), SBR 1502 (an emulsion copolymer of 23.5 percent styrene and 76.5 percent butadiene) and EPDM (Royalene 301T) or poly(trans-1,4-hexadiene). The compounding recipe is given in Table I. The tensile strength and 300 percent modulus values of the blend composition containing hexadiene rubber are somewhat higher than those obtained for the control blend containing EPDM. The blends in Series B contained natural rubber (No. 1 smoked sheet), cis-1,4-polybutadiene (minimum 95 percent cis-1,4-structure, inherent viscosity 3.0) and EPDM (Royalene 301T) or poly(5-methyl-1,4-hexadiene). The compounding recipe is given in Table VI. The tensile strength and 300 percent modulus values of the white sidewall blend composition containing hexadiene rubber are higher than those obtained for the control blend containing EPDM.

TABLE VIII
STRESS-STRAIN PROPERTIES OF RUBBER BLEND TIRE SIDEWALL COMPOSITIONS
Rubber Blend Composition Series A

| Natural Rubber | SBR 1502 | EPDM | Hexadiene Rubber[b] | Tensile strength, psi | 300% modulus, psi | Elongation at break, % |
|---|---|---|---|---|---|---|
| 35 | 35 | 30 | 0 | 2110 | 670 | 590 |
| 35 | 35 | 0 | 30 | 2450 | 980 | 540 |

Series B

| Natural Rubber | Polybutadiene | EPDM | Hexadiene rubber[c] | Tensile strength, psi | 300% modulus, psi | Elongation at break, % |
|---|---|---|---|---|---|---|
| 55 | 20 | 25 | 0 | 2100 | 400 | 700 |
| 55 | 20 | 0 | 25 | 2580 | 530 | 660 |

[a]Samples cured for 18 minutes at 300° F.
[b]Poly(trans-1,4-hexadiene), inherent viscosity 2.7; monomer containing 93% trans-1,4-hexadiene and 7% cis-1,4-hexadiene was polymerized to 17% conversion.
[c]Poly(5-methyl-1,4-hexadiene), inherent viscosity 1.7; monomer of 98% purity 5-methyl-1,4-hexadiene was polymerized to 98% conversion.

EXAMPLE 5

Samples of several rubber blend compositions containing natural rubber (No. 1 smoked sheet) and poly(trans-1,4-hexadiene) were prepared by mixing the rubbers in a Banbury with carbon black and other ingredients as specified in Table IX. Sulfur and accelerators were then milled into the black stocks. Tensile sheets (6"×6"×0.08") were prepared by curing for 18 minutes at 300° F. Stress-strain data are shown in Table X.

A kinetic ozone test was conducted on the natural rubber, the hexadiene rubber and the blend composition containing 70 parts natural rubber and 30 parts hexadiene rubber from Table X. Cured samples (6"×0.5"×0.08") were flexed from zero to about 25 percent elongation at the rate of 25 cycles per minute. Flexing was carried out at 37.8° C. for 144 hours in a sealed ozone chamber having ozone concentration of 50 parts per 100 million by volume. The natural rubber sample exhibited heavy cracking after 24 hours of testing. However, the hexadiene rubber and blend composition exhibited no visible signs of ozone cracking after 144 hours. DeMattia flex measurements were also conducted on these compositions using pierced groove flex strips having dimensions of 6"×1.5"×0.25". The natural rubber sample failed after 1.4 million flexes and the hexadiene rubber sample after only 15 thousand flexes. However, the blend composition of 70 parts natural rubber and 30 parts hexadiene rubber was still flexing after 5 million flexes.

TABLE IX

COMPOUND RECIPE

| Compound | Parts | |
|---|---|---|
| Rubbers | 100 | |
| ISAF Carbon Black | 50 | |
| Stearic Acid | 2 | Banbury Mix |
| Zinc Oxide | 3 | |
| Antioxidant | 1 | |
| Sulfur | 1.6 | Mill Mix |
| Accelerators | 1.3 | |

TABLE X

STRESS-STRAIN PROPERTIES OF RUBBER BLEND COMPOSITIONS

Rubber Blend Composition

| Natural Rubber | Hexa- diene$^a$ Rubber | Tensile strength, psi | 100% modulus, psi | 300% modulus, psi | Elongation at Break, % |
|---|---|---|---|---|---|
| 100 | 0 | 4660 | 383 | 2130 | 520 |
| 70 | 30 | 3610 | 420 | 2280 | 420 |
| 50 | 50 | 1890 | 380 | — | 300 |
| 30 | 70 | 1160 | 320 | — | 250 |
| 0 | 100 | 1220 | 420 | — | 230 |

$^a$Poly(trans-1,4-hexadiene), inherent viscosity 3.8; monomer containing 93% trans-1,4-hexadiene and 7% trans-1,4-hexadiene was polymerized to 29% conversion.

EXAMPLE 6

Samples of rubber blend compositions containing polypentenylene and poly(trans-1,4-hexadiene) were prepared using the compounding recipe specified in Table XI. Tensile sheets for stress-strain measurements were prepared by curing for 10 minutes at 320° F. The blends show a progressive decrease in tensile strength, 300% modulus, and elongation at break with increasing proportion of hexadiene rubber. However, the 50:50 blend had a higher tensile strength than the corresponding blend prepared with natural rubber (Example 5, Table X).

TABLE I

COMPOUND RECIPE

| Compound | Parts | |
|---|---|---|
| Rubbers | 100 | |
| ISAF Carbon Black | 50 | |
| Stearic Acid | 2 | Banbury Mix |
| Zinc Oxide | 3 | |
| Antioxidant | 1 | |
| Sulfur | 2 | Mill Mix |
| Accelerator | 0.4 | |

TABLE XII

STRESS STRAIN PROPERTIES OF RUBBER BLEND COMPOSITIONS

| Polypen- tenylene$^a$ | Hexa- diene rubber$^b$ | Tensile Strength, psi | 300% Modulus, psi | Elongation at Break, % |
|---|---|---|---|---|
| 100 | 0 | 4420 | 2170 | 520 |
| 70 | 30 | 3260 | 1700 | 460 |
| 50 | 50 | 2610 | 1670 | 400 |

$^a$Polypentenylene is a homopolymer of cyclopentene prepared with a W/Al catalyst; inherent viscosity 2.4; 87 percent trans structure of the double bond.
$^b$Poly(trans-1,4-hexadiene), inherent viscosity 5.1; monomer containing 93% trans-1,4-hexadiene and 7% cis 1,4-hexadiene was polymerized to 23% conversion.

What is claimed is:

1. An elastomeric composition consisting essentially of, based on 100 parts by weight rubber (A) about 15 to about 60 parts by weight of rubbery polymer of at least one nonconjugated diolefin having the formula:

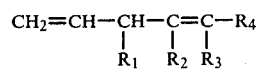

where $R_1$, $R_2$ and $R_3$ are hydrogen, a lower alkyl group containing up to 4 carbon atoms or an aryl group, and $R_4$ is a lower alkyl group containing up to 4 carbon atoms or an aryl group, (B) about 85 to about 40 parts by weight of high unsaturation rubber selected from the group consisting of at least one of natural high cis-1,4-polyisoprene rubber, synthetic high cis-1,4-polyisoprene, high cis-1,4-polybutadiene, butadiene/styrene rubber and polyalkenylenes and (C) 0 to about 40 parts by weight of at least one low unsaturation rubber selected from an EPDM and halobutyl rubber, where said EPDM rubber is an ethylene-propylene-nonconjugated diene terpolymer containing from about 20 to about 75 weight percent units derived from ethylene, from about 80 to 25 weight percent units derived from propylene, and a minor proportion of from about 1 to 15 weight percent units derived from a $C_5$-$C_{30}$ nonconjugated diene and where said halobutyl rubber is a chlorinated or brominated butyl rubber prepared by copolymerization of isobutylene and isoprene to form a butyl-type rubbery copolymer containing about 95 to about 98 weight percent isobutylene and, correspondingly, about 5 to about 2 weight percent isoprene and then chlorinating or brominating said copolymer to form the halobutyl rubber containing about 0.5 to about 2.0 weight percent chlorine or bromine and about 0.5 to about 3.5 mole percent unsaturation expressed in units of carbon-to-carbon double bonds per kilogram of polymer.

2. The elastomeric composition of claim 1 where said rubbery hexadiene rubber is a homopolymer or interpolymer of at least one monomer selected from cis-1,4-hexadiene, trans-1,4-hexadiene, cis-1,4-heptadiene, trans-1,4-heptadiene, 4-methyl-1,4-hexadiene, 5-methyl-1,4-hexadiene, 4-ethyl-1,4-hexadiene, 5-ethyl-1,4-hexadiene, 4-butyl-1,4-hexadiene, 5-butyl-1,4-hexadiene, 3-methyl-1,4-hexadiene, 3,4-dimethyl-1,4-hexadiene, cis-1,4-nonadiene, trans-1,4-nonadiene, 6-phenyl-1,4-hexadiene, 5-phenyl-1,4-hexadiene, 5-p-tolyl-1,4-hexadiene or 4,5-diphenyl-1,4-hexadiene.

3. The elastomeric composition of claim 2 where said rubbery hexadiene rubber is a polymer of at least one of trans-1,4-hexadiene, 4-methyl-1,4-hexadiene or 5-methyl-1,4-hexadiene monomers.

4. The elastomeric composition of claim 1 where said EPDM rubber is an ethylene-propylene-diene terpolymer containing from about 20 to 75 weight percent units derived from ethylene, from about 80 to 25 weight percent units derived from propylene, and a minor proportion of from about 1 to 15 weight percent units derived from a $C_5$–$C_{30}$ non-conjugated diene.

5. The elastomeric composition of claim 4 where said EPDM is a terpolymer of ethylene/propylene/and a diene selected from 1,4-hexadiene, dicyclopentadiene, ethylidene norbornene or methylene norbornene.

6. The elastomeric composition of claim 1 where said halobutyl rubber is a chlorinated or brominated butyl rubber prepared by copolymerization of isobutylene and isoprene to form a butyl-type rubbery copolymer containing about 95 to about 98 weight percent isobutylene units and, correspondingly, about 5 to about 2 weight percent isoprene units and then chlorinating or brominating said copolymer to form the halobutyl rubber containing about 0.5 to about 2.0 weight percent chlorine or bromine and about 0.5 to about 3.5 mole percent unsaturation expressed in units of carbon-to-carbon double bonds per kilogram of polymer.

7. The elastomeric composition of claim 1 where said rubbery polymer is of at least one of trans-1,4-hexadiene, 4-methyl-1,4-hexadiene or 5-methyl-1,4-hexadiene, said EPDM rubber is an ethylene-propylene-nonconjugated diene terpolymer containing from about 20 to 75 weight percent units derived from ethylene, from about 80 to 25 weight percent units derived from propylene, and a minor proportion of from about 1 to 15 weight percent units derived from a nonconjugated diene selected from at least one of 1,4-hexadiene, dicyclopentadiene, ethylidene norbornene, or methylene norbornene, and where said halobutyl rubber is a chlorinated or brominated butyl rubber prepared by solution copolymerization of isobutylene and isoprene to form a butyl-type rubbery copolymer containing about 95 to about 98 weight percent isobutylene units and, correspondingly, about 5 to about 2 weight percent isoprene units and then chlorinating or brominating said copolymer to form the halobutyl rubber containing about 0.5 to about 2.0 weight percent chlorine or bromine and about 0.5 to about 3.5 mole percent unsaturation expressed in units of carbon-to-carbon double bonds per kilogram of polymer.

* * * * *